United States Patent [19]

Arnold

[11] Patent Number: 4,825,732
[45] Date of Patent: May 2, 1989

[54] ELASTOMERIC SLEEVE FOR CONVENTIONAL WRENCH SOCKETS

[75] Inventor: Robert L. Arnold, Lancaster, Pa.

[73] Assignee: Easco Hand Tools, Inc., Baltimore, Md.

[21] Appl. No.: 930,249

[22] Filed: Nov. 13, 1986

Related U.S. Application Data

[63] Continuation-in-part of Ser. No. 804,533, Dec. 4, 1985.

[51] Int. Cl.$^4$ .......................... B25B 13/06; B25G 1/00
[52] U.S. Cl. ............................... 81/121.1; 81/DIG. 5; 81/177.1; 81/180.1
[58] Field of Search ...................... 81/492, 489, 121.1, 81/122–123, DIG. 5, 177.1, 177.85, 180.1, 184–185, 900; 16/116 R, DIG. 12; 408/226

[56] References Cited

U.S. PATENT DOCUMENTS 1,902,438  3/1933  Foley ..................................... 81/489

OTHER PUBLICATIONS

*Jensen Tools and Alloys*, Fall Catalog, 1977, p. 86, "Cushion Grip Screwdrivers".
*Husky Mechanics' Hand Tools*, Cat. No. 103, 8/1961, p. 17, "Carbon Socket Wrench Sets", No. 2550.

*Primary Examiner*—Debra Meislin
*Attorney, Agent, or Firm*—Leonard Bloom

[57] ABSTRACT

A molded elastomeric sleeve is carried on a conventional wrench socket. The sleeve has a radially extending boss, a recess formed in the boss and a peripheral rim formed about the boss defining the recess therein. The sleeve has an internal annular groove formed therein as well as a radial passageway which extends from the groove to the recess. Adhesive is injected into the annular groove via the radial passageway, whereby the sleeve is secured to the socket. A size indicia label is provided having adhesive thereon. This label is positioned in the recess below the rim of the boss covering the radial passageway, where it is secured by the adhesive. The sleeve further has suitable knurls formed on the outer diameter of the sleeve. The knurls and the boss prevent the socket from rolling, if placed sideways on a flat surface. The knurls and the boss also facilitate manual rotation of the socket. After forming, the sleeve is axially oriented and slidably positioned on a portion of the socket. Adhesive is then injected into the annular groove via the radial passageway. After forming the size indicia label, said label is disposed in the recess and is adhesively secured therein, covering the radial passageway, such that it aids in retaining the adhesive therein.

21 Claims, 8 Drawing Sheets

ELASTOMERIC SLEEVE FOR CONVENTIONAL WRENCH SOCKETS

CROSS-REFERENCE TO RELATED APPLICATION

The present application is a continuation-in-part of U.S. application, Ser. No. 804,533, filed Dec. 4, 1985, copending herewith.

FIELD OF THE INVENTION

The present invention relates to an elastomeric sleeve which is carried on, and secured to the rearward portion of a conventional respective wrench socket, (or sockets) used with ratchet wrench kits or the like to quickly facilitate recognition and selection of a desired socket in the kit.

BACKGROUND OF THE INVENTION

Socket kits or sets usually have a ratchet wrench, various adapters, accessories or attachments, and a plurality of sockets used interchangeably with the ratchet wrench. The ratchet wrench comprises a driving handle having a square-drive tang or stud which, for example, may constitute a ¼″, ⅜″ or ½″ drive. The sockets usually have an output hexagonal bore for engagement with a nut or head of a bolt; and these hexagonal sockets may range, for example, from 3/16″ to ¾″ in sixteenth inch increments.

The average ratchet wrench kit may have about a dozen individual sockets, each of which is stamped with the size of its output hexagonal bore. These size indications are hard to see, especially when used beneath a vehicle, in cramped quarters, or in poorly lighted working areas. The individual pieces in a kit sometimes get mixed up, and the problem may be compounded due to English and Metric sizes.

SUMMARY OF THE INVENTION

Accordingly, it is an object of the present invention to provide an identifying sleeve carried on a conventional wrench socket, thereby facilitating user recognition and selection of a desired socket.

Accordingly, it is a further object of the present invention to alleviate the disadvantages and deficiencies of the prior art by providing an identifying sleeve on the rearward portion of each socket, thereby quickly facilitating user recognition and selection of a desired socket.

It is another object of the present invention to provide a molded elastomeric sleeve that has size indicia molded thereon, and, if desired, may be color coded.

It is yet another object of the present invention to provide an identifying sleeve for a wrench socket, which may be manufactured easily and economically, and which facilitates a merchandising and promotion of entire wrench kits or sets having sockets equipped with respective identifying sleeves.

It is still yet another object of the present invention to provide a method to easily and economically manufacture an identifying sleeve for a socket wrench.

In accordance with the teachings of the present invention, a sleeve is disposed on the rearward portion of a socket. Means is provided for securing the sleeve on the socket. The sleeve has a boss formed thereon. The boss has a recess formed therein. Additionally, size indicia means is disposed within the recess.

Preferably, the sleeve has an internal annular groove formed therein. The sleeve further has a radial passageway formed therein. The radial passageway extends from the internal annular groove to the recess in the boss on the sleeve. Additionally an adhesive is disposed within the internal annular groove and injected therein via the radial passageway. It is preferred that the boss extends radially of the sleeve. The boss has a peripheral rim defining the recess in the boss. Also, the rim has respective top surfaces disposed substantially within a plane that is substantially parallel to the longitudinal axis of the socket, thereby precluding the socket from rolling when the socket is placed on its cylindrical side wall on a table. Furthermore, it is preferred that the size indicia means be a laminated label adhesively secured within the recess in the boss, the label covering the radial passageway, and the label being disposed below the rim of the boss. Finally, it is preferred that the sleeve be molded from an elastomeric material, and be provided with knurls for facilitating manual rotation of the socket.

In accordance with the further teachings of the present invention, the elastomeric sleeve is adhesively secured on the rearward portion of the socket. A boss is formed on the sleeve. The boss has a peripheral rim defining a recess in the boss. Additionally, a laminated pressure-sensitive adhesive label is disposed within the recess in the boss and below the rim thereon, the label having size indicia printed thereon.

In accordance with still further teachings of the present invention, the elastomeric sleeve is adhesively secured on the rearward portion of the socket. A boss is formed on the sleeve. The boss has a peripheral rim defining a recess in the boss. Size indicia is positioned within the recess and disposed below the rim. Additionally, the rim has respective top surfaces disposed substantially within a plane, thereby precluding the socket from rolling on a table.

In another aspect of the present invention, a sleeve is adapted to be secured on a wrench socket. A boss is formed on the sleeve. The boss has a recess formed therein. Size indicia means is disposed in the recess for facilitating convenient recognition and selection of the socket. Preferably, the sleeve has an internal annular groove formed therein. The sleeve further has a radial passageway formed therein. The radial passageway extends from the internal annular groove to the recess in the boss on the sleeve. Additionally, an adhesive is disposed within the internal annular groove via the radial passageway. Preferably, the size indicia means comprises a laminated label adhesively secured within the recess in the boss, the label being so disposed below the rim of the boss covering the radial passageway. The label also has indicia thereon.

In a preferred embodiment, the size indicia means is a laminated label adhesively secured within the recess in the boss, said label having indicia thereon. Preferably, the boss extends radially of the sleeve. A peripheral rim is formed about the boss defining the recess in the boss. The rim also has respective top surfaces disposed within a substantially common plane. It is further preferred that the common plane being oriented substantially parallel to the longitudinal axis of the socket. Additionally, the sleeve is molded from an elastomeric material. Preferably, knurls are formed on the sleeve for facilitating manual rotation of the socket. Additionally, it is preferred that an adhesive is disposed within the internal annular groove via the radial passageway.

In accordance with the further teachings of the present invention, the elastomeric sleeve is adhesively secured on a socket. A boss is formed on the sleeve. The boss has a peripheral rim defining a recess in the boss. Finally, an adhesive label is disposed within the recess in the boss and below the rim thereon. This label has size indicia thereon.

In still further accordance with the teachings of the present invention, the elastomeric sleeve is adhesively secured on the socket. A boss is formed on the sleeve. The boss has a peripheral rim defining a recess in the boss. Size indicia is positioned within the recess and disposed below the rim. The rim has respective top surfaces disposed substantially in a common plane.

In its broadest aspect, the present invention teaches a sleeve adapted to be secured on a wrench socket, the sleeve having size indicia means thereon for facilitating a convenient recognition and selection of the socket.

In yet another aspect of the present invention, a method of forming a sleeve secured on a wrench socket is taught. This method involves forming an elastomeric material into a sleeve including a boss having a recess formed therein. A laminated label is formed having indicia thereon and having adhesive disposed thereon. The sleeve is axially oriented and slidably positioned on a portion of the socket. Adhesive is positioned between at least a portion of the sleeve and the socket, whereby the sleeve is adhesively secured there. Additionally, the label is disposed in the recess with the adhesive contacting the boss, whereby the label is adhesively secured therein with the indicia visible. In a preferred embodiment, the elastomeric material is formed into a sleeve including a boss having a recess formed therein. Said sleeve is also provided having an internal annular groove formed therein and further having a radial passageway formed therein extending from the internal annular groove to the recess. Additionally, in this embodiment the adhesive is injected into the internal annular groove of the sleeve disposed on the socket via the radial passageway, whereby the sleeve is adhesively secured thereto. Furthermore, the label is disposed in the recess covering the radial passageway with the adhesive contacting the boss, whereby the label is adhesively secured therein with the indicia visible.

In yet another preferred embodiment, the elastomeric material is formed into a sleeve having a boss formed thereon that extends radially from the sleeve. The boss is also provided having a recess formed therein. The sleeve is provided having an internal annular groove formed therein, and further having a radial passageway formed therein, extending from the groove to the recess. A peripheral rim is formed about the boss defining the recess in the boss, said rim having respective top surfaces disposed in a substantially common plane being oriented substantially perpendicular to the radial passageway.

These and other objects of the present invention will become apparent from a reading of the following specification, taken in conjunction with the enclosed drawings.

GENERAL DESCRIPTION OF THE PREFERRED EMBODIMENT

With reference to FIGS. 1-4, a wrench socket 10 has a forward portion 11 and a rearward portion 12. The rearward portion 12 may be diametrically-reduced (or turned down) to form an annular shoulder 13 between the forward and rearward portions of the socket. A sleeve 14 is carried on the reduced rearward portion of the socket and may abut (or seat) against the annular shoulder. Preferably, the sleeve 14 is integrally molded from a suitable plastic, rubber or other elastomeric material. A suitable adhesive (denoted schematically by 15 in FIG. 4) secures the sleeve on the socket and precludes an axial separation therebetween.

Figure 1:
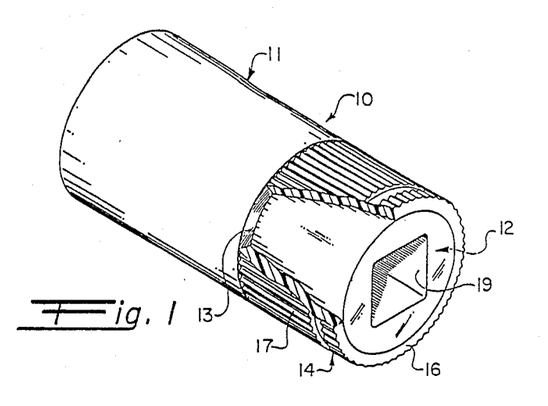
FIG. 1 is a perspective view of a preferred embodiment of a typical wrench socket having an elastomeric identifying sleeve carried on the rearward portion of the socket, in accordance with the teachings of the present invention.
Figure 2:
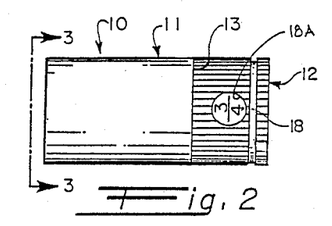
FIG. 2 is a side elevation of the socket and sleeve of FIG. 1.
Figure 3:
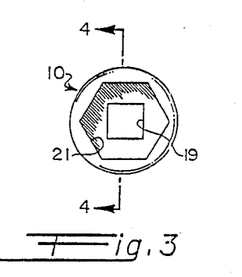
FIG. 3 is an end view thereof, taken along the lines 3—3 of FIG. 2, and looking into the hexagonal bore in the socket.
Figures 4, 5:
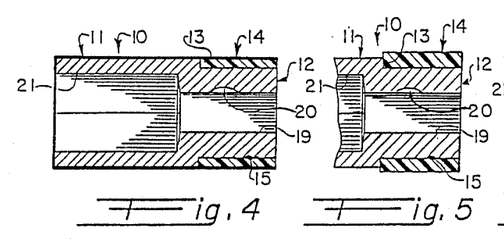
FIG. 4 is a longitudinal section of the socket and sleeve, taken across the lines 4—4 of FIG. 3, and showing the sleeve substantially coterminous, radially, with the outer diameter of the socket (with respect to certain sockets).
FIG. 5 is a partial longitudinal section, corresponding substantially to a portion of FIG. 4, but showing how the sleeve may extend, radially, somewhat beyond the outer diameter of the socket (with respect to certain other sockets).
Figure 10:
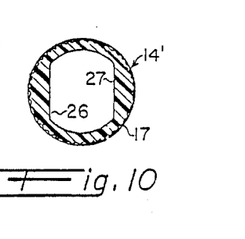
FIG. 10 is a cross-sectional view of the socket, taken along the lines 10—10 of FIG. 9, and showing the "double dee" configuration for keying the socket to the sleeve.

The sleeve 14 has an end face 16 which, preferably, is coterminous (axially) with the rearward end of the socket, as shown more clearly in FIGS. 1 and 4. The sleeve further has an outer diameter which is substantially coterminous (radially) with the outer diameter of the forward portion 11 of the socket, as shown more clearly in FIG. 4. The outer diameter of the sleeve is provided with a plurality of longitudinal knurls 17 (or other flutes or splines) to facilitate a manual gripping of the sleeve (as shown in FIG. 10). These knurls also tend to prevent the socket from rolling, if placed sideways on a flat surface. The axial length of the sleeve may range from about ½" to 1" for most sockets.

The sleeve 14 is provided with suitable size indicia (generally indicated as at 18 in FIG. 2) disposed in a suitable recess 18A for easy identification and selection in a tool box or kit. The indicia (numbers and/or letters) are preferably molded within the sleeve and may be raised or projecting; and, if desired, the indicia may be molded clear through, so that the underlying socket portion is visible. The sleeve may also be color coded.

As shown more clearly in FIG. 4, the socket has a square drive input bore 19 provided with spaced pockets 20. These pockets 20 are adapted to receive the conventional ball detent (not shown) carried on the drive tang or stud of the wrench. The socket further has a conventional hexagonal drive output bore 21 for cooperation with the head of a bolt 22 (shown in FIGS. 10 and 11) or the nut 23.

With respect to some other sockets in the kit, the sleeve 14 may extend somewhat (radially) beyond the outer diameter of the forward portion of the socket, as shown in FIG. 5, but is still substantially coterminous therewith.

Figure 6:
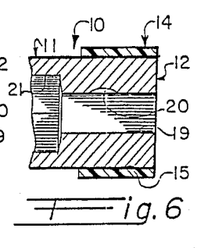
FIG. 6 is a partial longitudinal section, corresponding to a portion of FIG. 4, but showing the sleeve extending radially of the socket, and further showing the sleeve adhesively secured on the rearward portion of the socket without an annular shoulder formed on the socket between the forward and rearward portions thereof.
Figure 7:
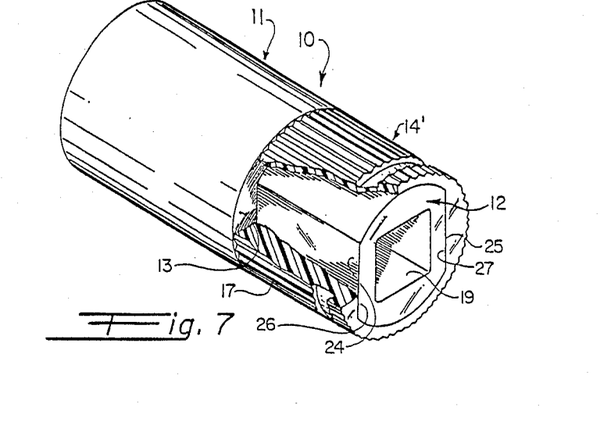
FIG. 7 is a perspective of a second embodiment of a typical wrench socket having an elastomeric sleeve carried on the rearward portion thereof, in accordance with the teachings of the present invention.
Figure 8:
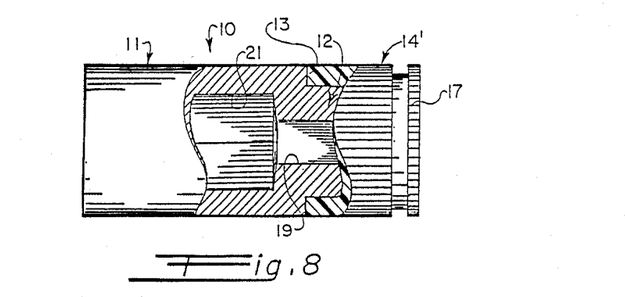
FIG. 8 is a longitudinal section, partially in elevation, of the socket and sleeve of FIG. 7.
Figure 9:
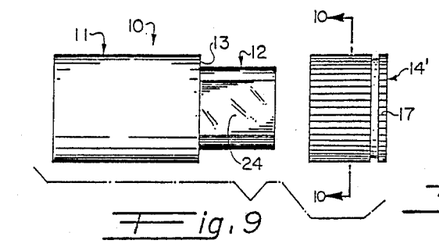
FIG. 9 is an exploded view of the socket and sleeve of FIG. 7.

As shown in FIG. 6, the sleeve 14 is carried on the rearward portion of the socket 10 (being adhesively secured thereto) and there is no annular shoulder between the respective forward and rearward portions of the socket.

With respect to FIGS. 7-10 (wherein like numbers are used for similar parts) an alternate embodiment is illustrated wherein the rearward portion 12 of the socket 10 is provided with a pair of diametrically-opposed flats 24 and 25. These flats cooperate with a pair of corresponding diametrically-opposed flats 26 and 27 formed within the sleeve 14'. The cooperating flats provide a means for keying the sleeve 14' to the socket 10 and further precluding relative rotation therebetween.

Figure 11:
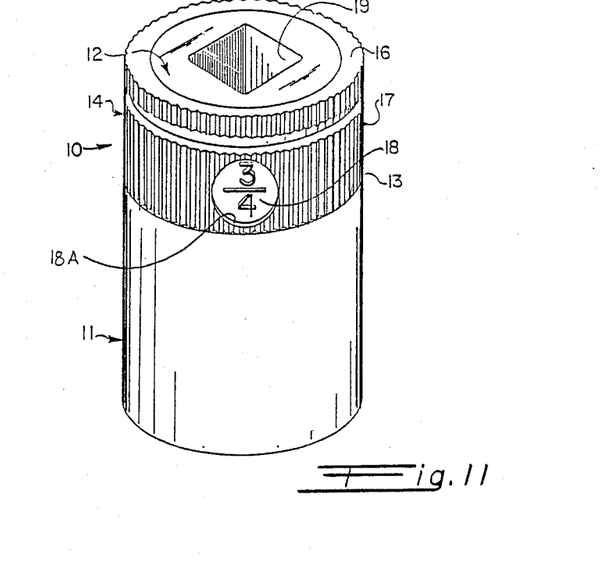
FIG. 11 is a further perspective of the socket and sleeve of FIG. 1, showing the raised molded-in indicia, as the socket is oriented with its hex output socket portion facing down.
Figure 12:
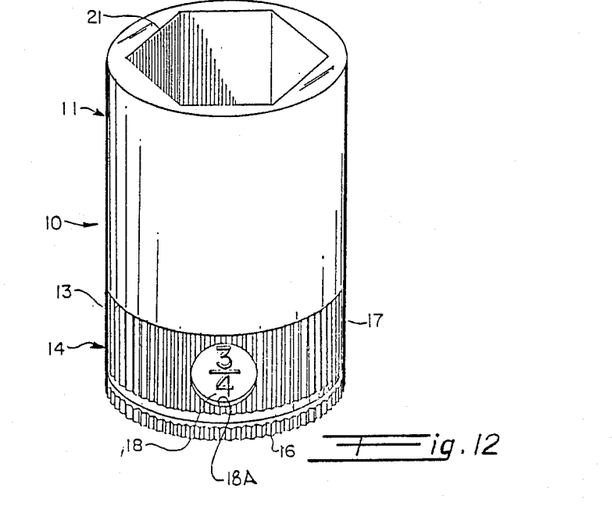
FIG. 12 is a still further perspective, corresponding substantially to FIG. 11, but showing the other side of the socket, and with the hex output socket portion facing up.

As shown in FIG. 11, the socket 10 is facing down, its sleeve is up, and the "¾" molded-in raised indicia 18 disposed in a suitable recess 18A on the sleeve is clearly visible. On the diametrically-opposed other side of the sleeve 14, the indicia 18 (such as the "¾" size marking) is reversed or inverted. With this arrangement, when the hex output portion of the socket is facing up as shown in FIG. 12, the "¾" indicia disposed in the recess 18A on the sleeve will be properly oriented for easy inspection, recognition and selection.

Figure 13:
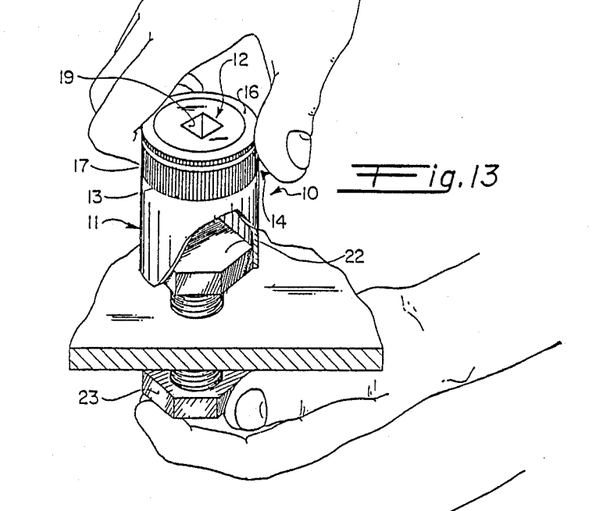
FIG. 13 illustrates how the sleeve may be grasped by the user for conveniently rotating the socket for seating the nut on the bolt in a typical application.
Figure 14:
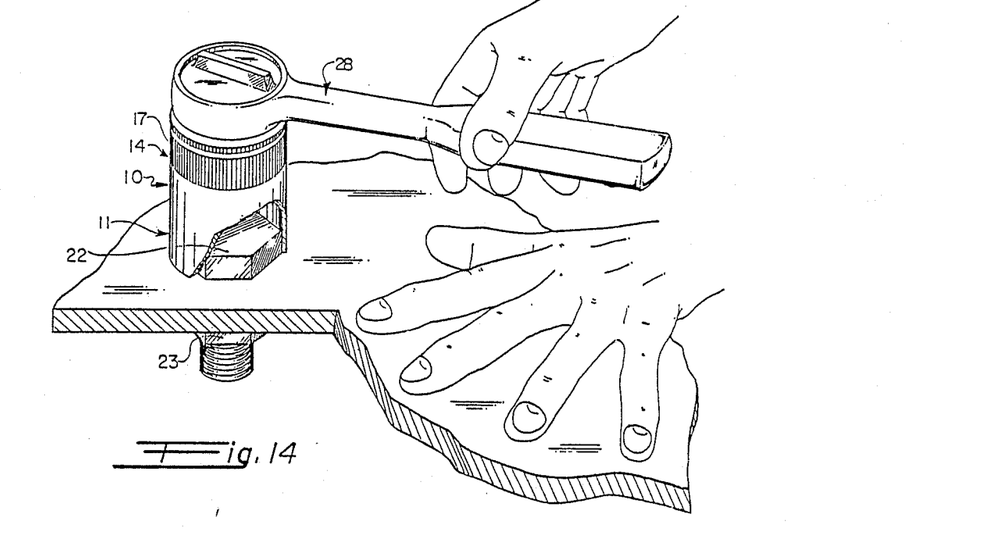
FIG. 14 illustrates the subsequent torquing of the bolt, using a conventional ratchet wrench for driving the socket.
Figure 15:
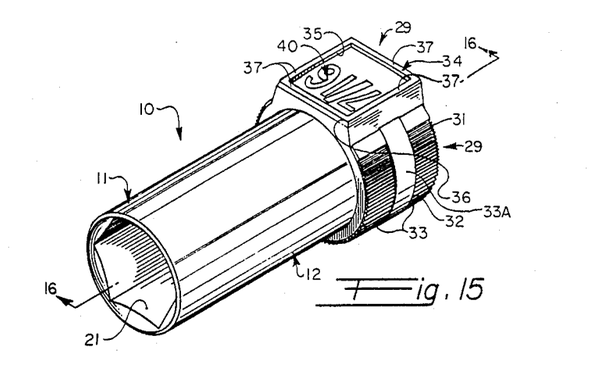
FIG. 15 is a perspective view of a conventional socket wrench having a preferred embodiment of an elastomeric sleeve carried thereon.

As shown in FIG. 13, the sleeve 14 may be grasped by the user to conveniently rotate the socket 10 for driving the bolt 22 on the nut 23. Thereafter, and when the nut is seated as shown in FIG. 14, the conventional ratchet wrench 28 may be used to torque the bolt.

With reference to FIGS. 15-20, (further wherein like numbers are used for similar parts) an alternate embodiment of the sleeve 29 is illustrated for use with a conventional wrench socket 10 having a drive input bore to receive the conventional drive tang or stud of the wrench, a conventional hexagonal drive output bore for cooperation with the head of a bolt or nut, a longitudinal axis and a cylindrical side wall of the type having contiguous forward and rearward portions, 11 and 12, respectively, which are substantially identical in cross-section. While described and illustrated in this fashion, it is to be understood by those skilled in the art, that this sleeve 29 could also be utilized with equal utility in conjunction with the turned-down form of wrench socket illustrated in FIGS. 1-5.

The sleeve 29 is carried on the socket 10. Preferably, the sleeve 29 is integrally molded from a suitable plastic, rubber or other elastomeric material. A suitable adhesive (denoted schematically by 30 with particular reference to FIGS. 18 and 19) secures the sleeve 29 on the socket 10 and precludes an axial separation therebetween.

Figure 16:
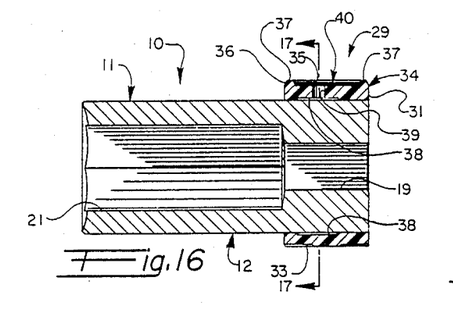
FIG. 16 is a longitudinal cross-section taken along lines 16—16 of FIG. 15.
Figure 18:
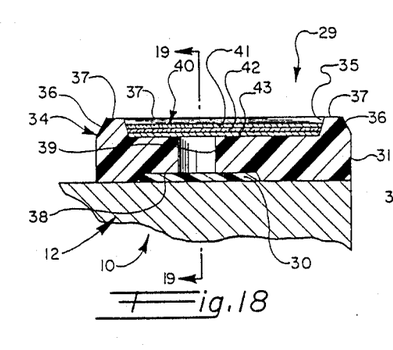
FIG. 18 is an enlarged partial longitudinal section, corresponding substantially to a portion of FIG. 16.
Figure 21:
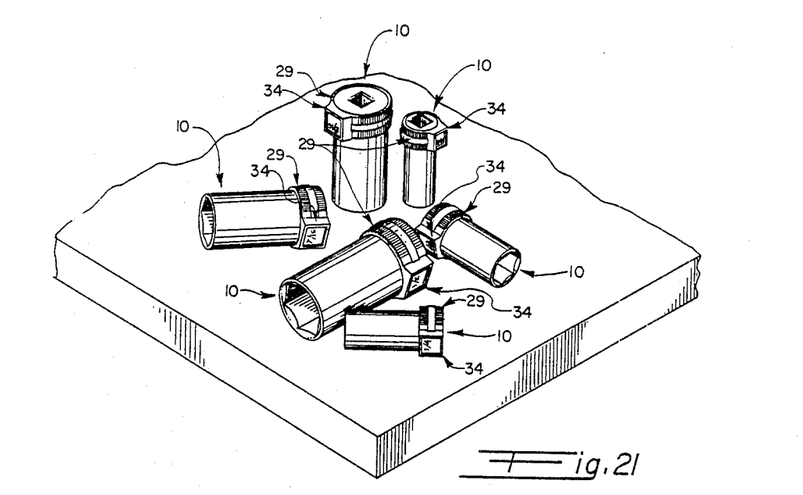
FIG. 21 illustrates how the sleeve precludes the socket, having the sleeve of FIG. 15 carried thereon, from rolling when placed on their cylindrical side walls on a flat surface such as the top of a table.

As is perhaps most clearly shown in FIGS. 16 and 18, the sleeve 29 has an end face 31 which, preferably, is coterminous (axially) with, as illustrated, the rearward end of the socket. The sleeve 29 has an outer diameter 32 being provided with a plurality of longitudinal knurls 33 (or other flutes of splines) to facilitate manual gripping of the sleeve 29. Additionally, these knurls 33 also tend to prevent the socket from rolling, if placed sideways on a flat surface (as shown in FIG. 21). The axial length of the sleeve 29 may range from about ½" to 1" for most sockets 10.

Integrally molded, the sleeve 29 has a boss 34 formed thereon, extending radially of the sleeve 29. As illustrated, the boss 34 is substantially square in shape. However, as will be understood by those skilled in the art, the boss 34 may alternatively be circular, rectangular or any other suitable shape.

The boss 34 has a recess 35 formed therein. This recess 35 is defined by a peripheral rim 36. The peripheral rim 36 is an integrally formed part of the boss 34 having respective top surfaces 37 which are disposed substantially within a common plane. Preferably, this plane is substantially parallel to the longitudinal axis of the socket 10. Formed thusly, this boss 34, substantially precludes the socket 10 from rolling when the socket 10, having the sleeve 29 carried thereon, is placed sideways (on its cylindrical side wall) on a flat surface such as the top of a table (FIG. 21). It also aids in facilitating manual rotation of the socket by providing a surface upon which pressure may be applied during said manual rotation.

Figure 17:
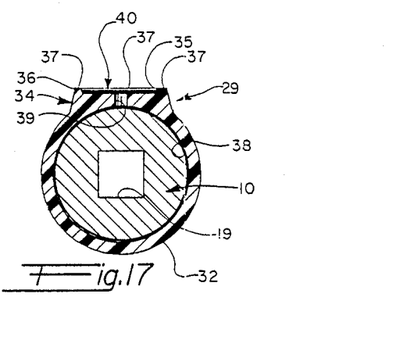
FIG. 17 is a cross-sectional view taken along lines 17—17 of FIG. 15.
Figure 19:
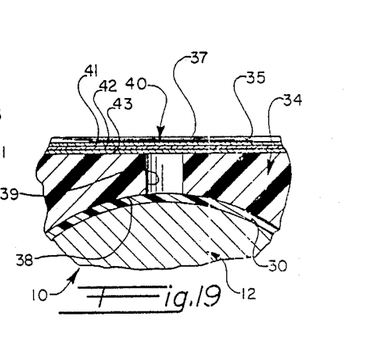
FIG. 19 is an enlarged partial section, corresponding substantially to a portion of FIG. 17.
Figure 20:
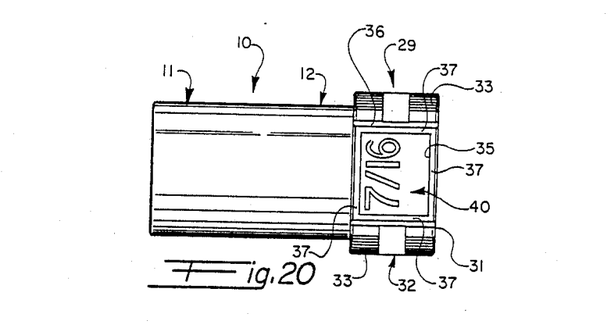
FIG. 20 is an elevational view of the sleeve and the associated socket of FIG. 15.

With particular reference now to FIGS. 18 and 19, as well as FIGS. 16 and 17, the sleeve 29 is further provided having an internal annular groove 38 formed therein. When the sleeve 29 is positioned on the socket 10, the groove 38 communicates with the cylindrical side wall of the socket 10. It is within this annular groove 38 that the adhesive 30 is disposed, contacting the cylindrical wall of the socket and thereby securing the sleeve on the socket.

The sleeve is further provided having a radial passageway 39 formed therein. Radial passageway 39 is positioned between, and extending from the internal annular groove 38 to the recess 35 in the boss 34 on the sleeve 29. Positioned thusly the radial passageway 39 provides for open cmmunication therebetween. As illustrated, the radial passageway 39 is positioned being oriented substantially perpendicular to the common plane.

With particular reference now to FIGS. 18, 19, 28 and 29, the size indicia means is illustrated. The size indicia means is, preferably, a pressure-sensitive laminated label 40 having indicia and adhesive thereon. Preferably, label 40 has an upper portion 41 of clear polyester (protective laminate) although, as will be understood by those skilled in the art, this upper portion 41 is optional and may be omitted without destroying the utility thereof. An indicia portion 42 is formed of, preferably, a clear polyester. The appropriate, desired indicia may be impression stamped, printed, engraved or otherwise suitably disposed thereon. Finally, a lower adhesive portion 43 is provided. This lower portion 43 is preferably formed of a metalized polyester that is silver (or any other desired color) colorized. An acryllic adhesive, as will be well known to those skilled in the art is disposed on that portion of the lower portion 43 which contacts the recess 35. Formed thusly, the laminated label is sized so as to be received within the recess 35, in the boss 34 below the rim 36 with the adhesive portion 43 contacting the recess 35. Positioned thusly, the laminated label 40 covers the radial passageway 39. Finally, if desired, a clear ultraviolet light cured sealant 44 is disposed over the upper portion 41 (See FIG. 29).

Preferably, this sealant is impervious to most hydrocarbon and liquid substances utilized in the automotive industry. This sealant 44 aids in securing the label in the recess and in preventing liquids and hydrocarbons from contacting the indicia and/or the adhesive. Preferably, the indicia is disposed on the label 40 such that, when the label 40 is positioned within the recess 35 with the lower adhesive portion 43 contacting the recess 35, the indicia is visible to the user to facilitate convenient recognition and selection of the desired socket.

With reference now to FIGS. 22-27, (wherein like numbers are used are similar parts) the preferred method of forming a sleeve 29 secured on a wrench socket 10 is illustrated. An elastomeric material is formed into a sleeve 29 including the boss 34 as described in detail above with reference to FIGS. 15-20 and 28 and 29. Additionally, a laminated label 40 having indicia printed thereon and having adhesive disposed thereon is formed also as described in detail above.

Figures 22, 23:
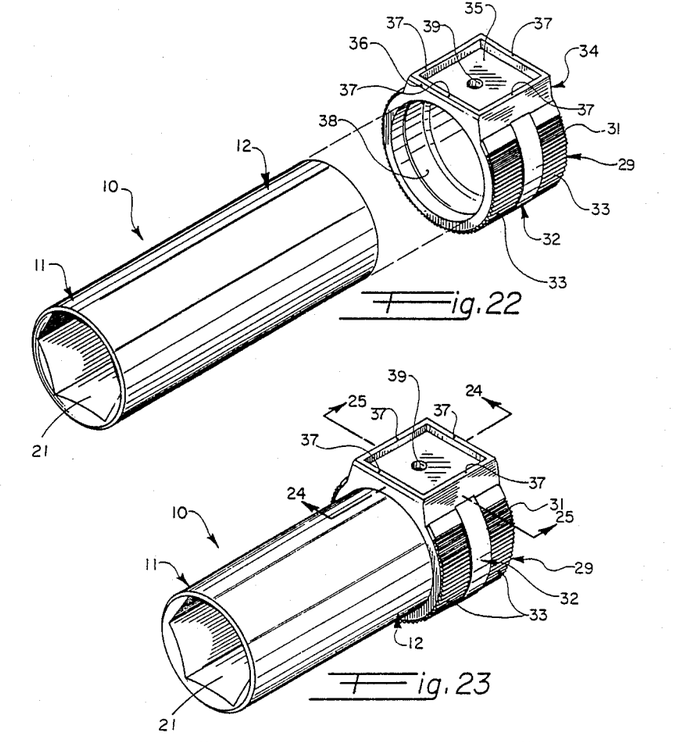
FIG. 22 is an exploded view, in perspective, of the socket and sleeve of FIG. 15, having the laminated label removed therefrom, illustrating a preferred method of the construction thereof.
FIG. 23 further illustrates the preferred method of construction with the sleeve being slidably disposed on the socket.
Figure 24:
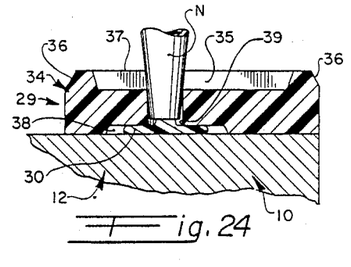
FIG. 24 is an enlarged partial longitudinal section, taken along line 24—24 of FIG. 23 corresponding substantially to a portion thereof, further illustrating the preferred method of construction with the adhesive being injected into the internal annular groove through the radial passageway.

The formed sleeve 29 is axially-oriented relative to the longitudinal axis of the conventional socket 10 (FIG. 22). The sleeve 29 is then slidably disposed on a portion of the socket (FIG. 23). Preferably, this sleeve 29 is located on the socket 10 with the end face 31 thereof preferably being positioned substantially coterminous (axially) with the rearward end of the socket (FIGS. 23 and 24).

Figure 25:
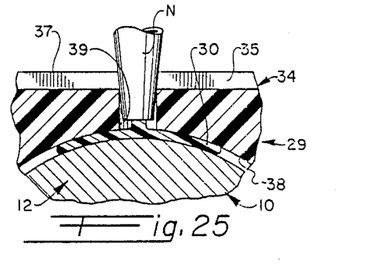
FIG. 25 is an enlarged partial section, as taken along line 25—25 of FIG. 23 corresponding substantially to a portion thereof, further illustrating the adhesive being injected into the internal annular groove through the radial passageway.

The mouth of an injection nozzle is then disposed in the radial passageway 39. Adhesive is then injected by the nozzle into the annular groove 38 via the radial passageway 39. Injected thusly, adhesive 30 is positioned between at least a portion of the sleeve and the socket, whereby the sleeve is adhesively secured thereto (FIGS. 24 and 25). However, as will be understood by those skilled in the art, the groove 38 is preferably completely filled with adhesive. In such cases, while not preferred, it is possible that at least a portion of the radial passageway 39 (and perhaps a portion of the recess 35 of the boss 34) may also become filled with adhesive.

Figure 26:
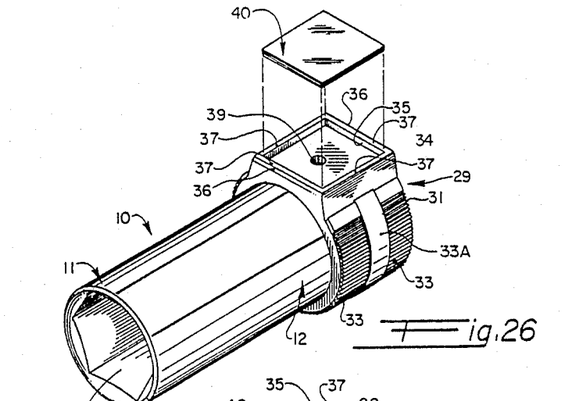
FIG. 26 further illustrates the preferred method of construction showing orientation of the laminated label.
Figure 27:
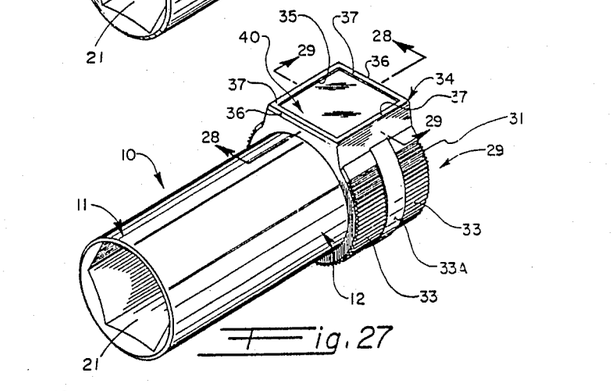
FIG. 27 corresponds substantially to FIG. 26, illustrating the laminated label being adhesively secured within the recess in the boss.
Figure 28:
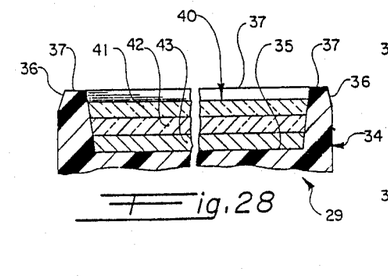
FIG. 28 is an enlarged partial longitudinal section, as taken along line 28—28 of FIG. 27 corresponding substantially to a portion thereof, illustrating the preferred positioning of the laminated label within the recess in the boss.
Figure 29:
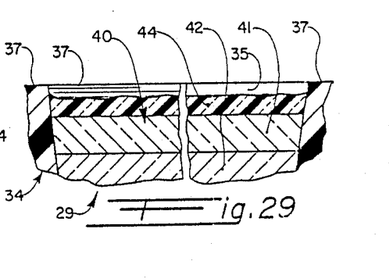
FIG. 29 is an enlarged partial section, as taken along line 29—29 of FIG. 27 corresponding substantially to a portion thereof, illustrating the placement of a clear ultraviolet light cured sealant over the indicia label.

Finally, the size indicia means (laminated label 40), having adhesive thereon, is aligned with the recess 35 of the boss 34 (FIG. 26). When aligned, the label 40 is then disposed in the recess 35 with the adhesive contacting the boss 34, whereby the label is adhesively secured therein with the indicia visible (FIG. 27). Positioned thusly, the laminated label also covers the radial passageway 39, thereby aiding in retaining the adhesive therein (FIG. 28). Then, a clear ultraviolet light cured sealant 44, which preferably is impervious to most hydrocarbons and liquids associated with the automotive industry, is poured over the upper portion 41 where it is permitted to set, forming a clear layer 44 thereover (FIG. 29). This sealant 44 aids in both securing the label in the recess 35 and, in preventing hydrocarbons and liquids from contacting either the indicia label 40 or the adhesive 30.

As can be seen from the foregoing description, the sleeve 29 is particularly advantageous in that it is easily and economically manufactured and does not require that new dies, etc., be fabricated for the manufacture of wrench sockets which are adaptable for use therewith. Rather, this sleeve is adaptable for use with presently existing wrench sockets which may already be in stock and/or for which casting dies are already in supply. In this manner, the sleeve 29 further facilitates manufacture, merchandising and promotion of the sockets and entire wrench kits or sets having sockets equipped with respective identifying sleeves 29.

Obviously, many modifications may be made without departing from the basic spirit of the present invention. For example, in lieu of a sleeve, a cap or bushing may be used. Accordingly, it will be appreciated by those skilled in the art that within the scope of the appended claims, the invention may be practice other than specifically described herein.

What is claimed is:

1. In combination with a wrench socket having respective forward and rearward portions disposed about a longitudinal axis of the socket, sleeve on the rearward portion of the socket, means for securing the sleeve on the socket including a boss formed on the sleeve, the boss having a recess formed therein, the sleeve having a passageway formed therein extending from the recess to an inner surface of the sleeve and providing for communication between the socket and the recess, an adhesive disposed through the passageway and into contact with the socket, and size indicia means disposed within the recess over the passageway, covering the adhesive therein.

2. In combination with a wrench socket having respective forward and rearward portions disposed about a longitudinal axis of the socket, a sleeve on the rearward portion of the socket, the sleeve having a boss formed thereon, the boss having a recess formed therein, and means for securing the sleeve on the socket, comprising the sleeve having an internal annular groove formed therein, the sleeve further having a radial passageway formed therein, the radial passageway extending from the internal annular groove in the sleeve to the recess in the boss on the sleeve, an adhesive disposed within the internal annular groove and injected therein via the radial passageway, and size indicia means disposed within the recess and covering the adhesive.

3. The combination of claim 1, wherein the socket has a substantially cylindrical side wall, wherein the boss extends radially of the sleeve, wherein the boss has a peripheral rim defining the recess in the boss, and wherein the rim has respective top surfaces disposed substantially within a plane that is substantially parallel to the longitudinal axis of the socket, thereby precluding the socket from rolling when the socket is placed on its cylindrical side wall on a table.

4. The combination of claim 1, wherein the size indicia means comprises a laminated label adhesively secured within the recess in the boss.

5. The combination of claim 1, wherein the sleeve is molded from an elastomeric material, and wherein the sleeve has an external cylindrical surface provided with knurls for facilitating rotation of the socket.

6. In combination with a wrench socket having respective forward and rearward portions disposed about a longitudinal axis of the socket, a sleeve on the rearward portion of the socket, the sleeve having a boss formed thereon, the boss having a recess formed therein, the sleeve having an internal annular groove formed therein, the sleeve further having a radial passageway formed therein, the radial passageway extending from the internal annular groove to the recess in the boss on the sleeve, an adhesive disposed within the internal annular groove and injected therein via the radial passageway, thereby securing the sleeve to fthe socket, the sleeve being molded from an elastomeric material, the sleeve being provided with knurls for facilitating rotation of the socket, the socket having substantially cylindrical side wall, the boss extending radially of the sleeve, the boss having a peripheral rim defining the recess in the boss, the rim having respective top surfaces disposed substantially within a plane that is substantially parallel to the longitudinal axis of the socket, thereby precluding the socket from rolling when the socket is placed on its cylindrical side wall on a table, and a laminated pressure-sensitive adhesive label secured within the recess in the boss, the label covering the radial passageway, being disposed below the rim of the boss, and having size indicia printed thereon.

7. In combination with a wrench socket having respective forward and rearward portions, an elastomeric sleeve adhesively secured on the rearward portion of the socket, a boss formed on the sleeve, the boss having a peripheral rim defining a recess in the boss, the sleeve having a passageway formed therein providing for communication between the socket and the recess in the boss, the passageway opening into the recess, such that the passageway is accessible externally of the boss on the sleeve, an adhesive disposed through the passageway and into contact with the socket, and a laminated pressure-sensitive adhesive label disposed within the recess in the boss and below the rim thereon and over the passageway, covering the adhesive therein, the label having size indicia printed thereon.

8. In combination with a substantially-cylindrical wrench socket having respective forward and rearward portions, an elastomeric sleeve adhesively secured on the rearward portion of the socket, a boss formed on the sleeve, the boss having a peripheral rim defining a recess in the boss, the sleeve having a passageway formed therein extending from the recess to an inner surface of the sleeve and providing for communication between the socket and the recess, an adhesive disposed through the passageway and into contact with the socket, size indicia within the recess and disposed below the rim and over the passageway, covering the adhesive therein, and the rim having respective top surfaces disposed substantially within a plane, thereby precluding the socket from rolling on a table.

9. A sleeve adapted to be secured on a wrench socket, said sleeve including: a boss formed on the sleeve, the boss having a recess formed therein, the sleeve having a passageway formed therein extending from the recess to an inner surface of the sleeve and providing for communication between the socket and the recess, an adhesive disposed through the passageway for contact with the socket, and size indicia means disposed in the recess for facilitating convenient recognition and selection of the socket.

10. The sleeve of claim 9, wherein said size indicia means comprises a laminated label adhesively secured within the recess in the boss over the passageway, said label having indicia thereon.

11. The sleeve of claim 9, wherein the sleeve is molded from an elastomeric material.

12. The sleeve of claim 9, wherein the sleeve is provided having knurls formed thereon for facilitating manual rotation of the socket.

13. A sleeve adapted to be secured on a wrench socket, said sleeve including: a boss formed on the sleeve, the boss having a recess formed therein, and size indicia means disposed in the recess for facilitating convenient recognition and selection of the socket, further including the sleeve having an internal annular groove formed therein, the sleeve further having a radial passageway formed therein, the radial passageway extending from the internal annular groove to the recess in the boss on the sleeve.

14. The sleeve of claim 13, further including an adhesive disposed within the internal annular groove via the radial passageway.

15. The sleeve of claim 13, wherein the size indicia means comprises a laminated label adhesively secured within the recess in the boss, covering the radial passageway, said label having indicia thereon.

16. The sleeve of claim 9, wherein the socket has a substantially cylindrical side wall, said sleeve further including the boss extending radially of the sleeve, a peripheral rim formed about the boss defining the recess in the boss, said rim having respective top surfaces disposed within a substantially common plane.

17. The sleeve of claim 16, wherein the sleeve has a longitudinal axis, said sleeve further including the common plane being oriented substantially parallel to the longitudinal axis of the sleeve.

18. A sleeve adapted to be secured on a wrench socket having a substantially cylindrical side wall and a longitudinal axis, said sleeve including: a boss formed thereon, the boss having a recess formed therein, the sleeve having an internal annular groove formed therein, the sleeve further having a radial passageway formed therein, the radial passageway extending from the internal annular groove to the recess in the boss on the sleeve, the sleeve being molded from an elastomeric material, the sleeve being provided with knurls for facilitating manual rotation of the socket formed thereon, the boss extending radially of the sleeve, a peripheral rim formed about the boss defining the recess in the boss, said rim having respective top surfaces disposed within a substantially common plane being oriented substantially parallel to the longitudinal axis of the socket and a laminated label adhesively secured within the recess in the boss, the label being so disposed below the rim of the boss covering the radial passageway and having indicia thereon for facilitating convenient recognition and selection of the socket.

19. The sleeve of claim 18, further including an adhesive disposed within the internal annular groove via the radial passageway.

20. An elastomeric sleeve adhesively secured on a socket, a boss formed on the sleeve, the boss having a peripheral rim defining a recess in the boss, the sleeve having a passageway formed therein extending from the recess to an inner surface of the sleeve and providing for communication between the socket and the recess, an adhesive disposed through the passageway and into contact with the socket, and an adhesive label disposed within the recess in the boss and below the rim thereon and over the passageway, covering the adhesive therein, the label having size indicia thereon.

21. An elastomeric sleeve adhesively secured on a wrench socket, a boss formed on the sleeve, the boss having a peripheral rim defining a recess in the boss, the sleeve having a passageway formed therein extending from the recess to an inner surface of the sleeve and providing for communication between the socket and the recess, an adhesive disposed through the passageway and into contact with the socket, size indicia within the recess and disposed below the rim and over the passageway, covering the adhesive therein, and the rim having respective top surfaces disposed substantially in a common plane.

* * * * *